United States Patent Office 3,231,061
Patented Jan. 25, 1966

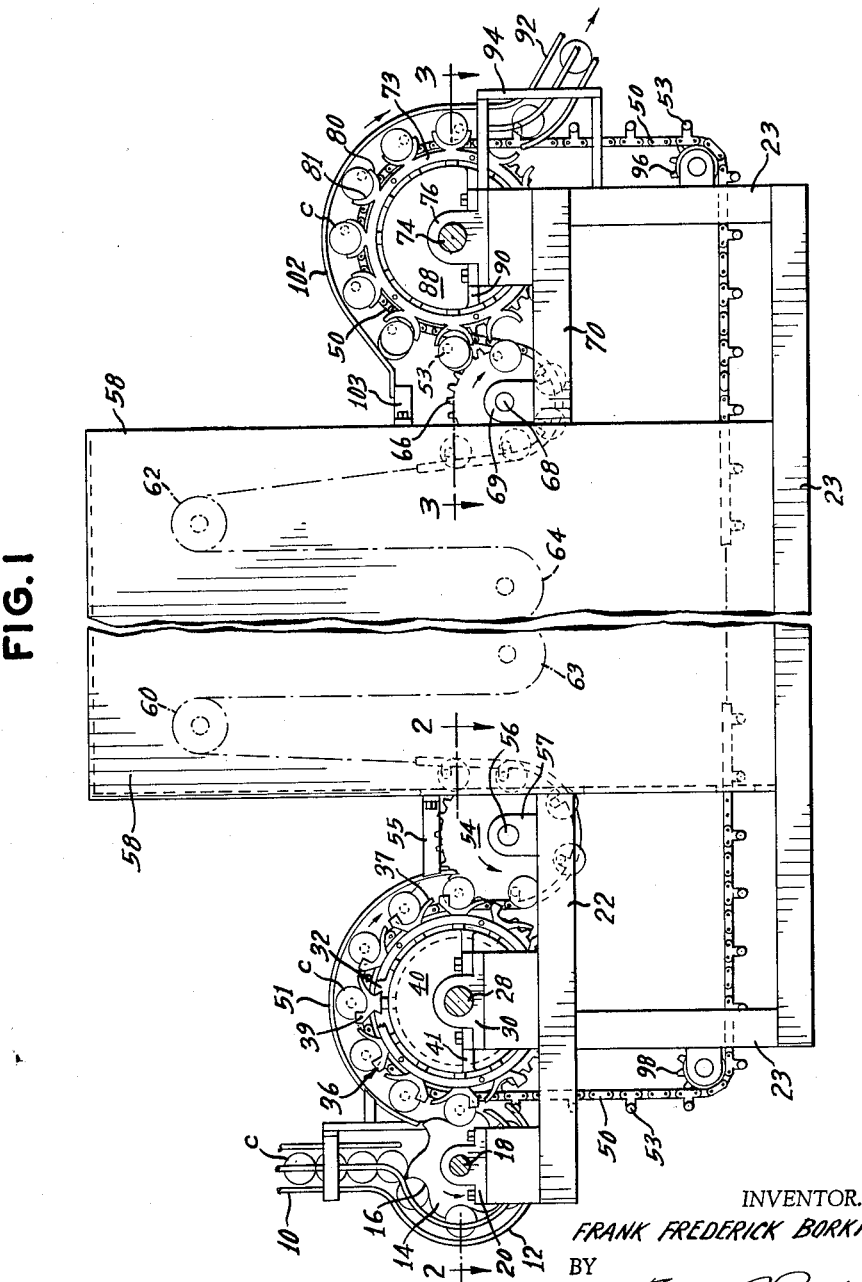

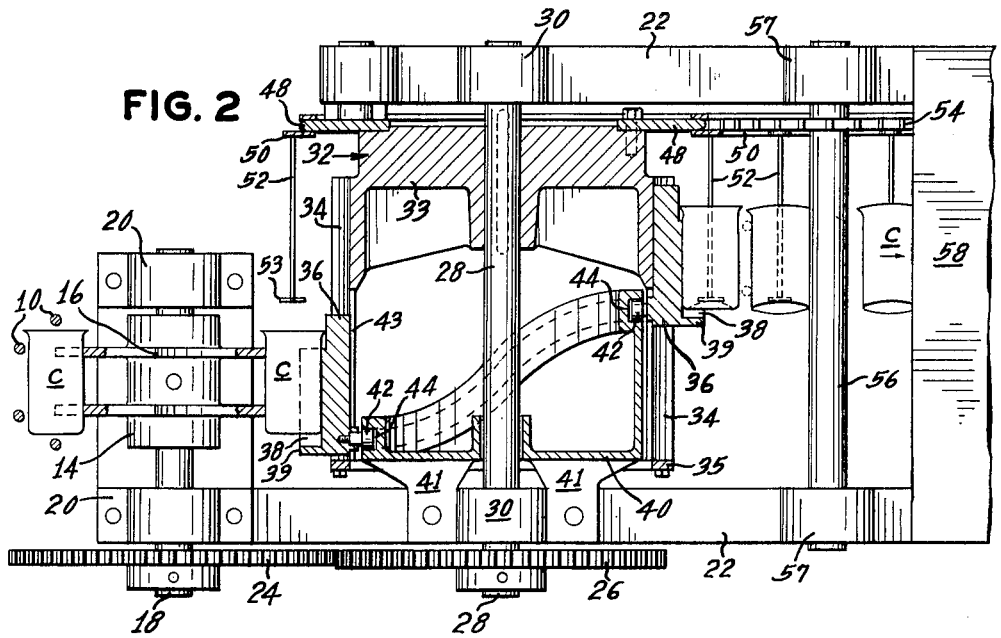

3,231,061
CAN HANDLING AND TRANSFERRING
APPARATUS
Frank Frederick Borkmann, Union, N.J., assignor to American Can Company, New York, N.Y., a corporation of New Jersey
Filed Dec. 3, 1963, Ser. No. 327,681
8 Claims. (Cl. 198—22)

The present invention relates to apparatus for transferring an article from one supporting means to another, and more particularly to apparatus for transferring a hollow article from a supporting pin on a conveyor chain to a pocket of a rotating turret, or from the turret pocket to the supporting pin, without damaging the interior or exterior of the article.

In the handling of hollow articles, such as containers having an open end, it is important to avoid damage to the interior and exterior of the containers when they are transferred to and from various supporting units on an operating line. Containers such as extruded aluminum cans are especially susceptible to damage, and thus such cans are normally mounted on supporting pins extending laterally from and attached to the conveyor chain which carries the cans through various phases of treatment such as washing and drying operations.

The present invention contemplates novel apparatus for transferring cans to such conveyor pins prior to a predetermined operation on the cans, and novel apparatus for removing the cans from the conveyor pins after the predetermined operation is completed, without damaging the interior or exterior of the containers. This novel apparatus comprises a rotatable support member or turret having pockets laterally slideable thereon for receiving cans from a can indexing means. The conveyor chain is mounted on a sprocket rigidly attached to the rotatable turret, and the supporting pins are aligned laterally with each of the turret pockets. After each pocket receives a can from the indexing means, it slides laterally towards the chain to position a supporting pin within the can after a predetermined rotation of the turret. The chain then leaves the turret sprocket with the upper interior surface of the can resting on the support pin and separated from the turret pocket.

Since there is no relative circumferential motion between the supporting pins and the turret pockets, and no lateral sliding contact between each can and its respective turret pocket or supporting pin, there is no marring or scratching of the interior or exterior of the can during its transfer from the turret pocket to the supporting pin. After a predetermined operation or operations have been performed on the cans while they are mounted on the supporting pins, the cans are removed from the pins by a rotatable turret having laterally or axially slideable pockets in a manner which is substantially the reverse of that employed for mounting the cans on the pins.

It is an object of the present invention, therefore, to provide apparatus for efficiently handling articles such as hollow containers.

Another object of the invention is to provide apparatus for transferring articles from one supporting means to another supporting means without damaging the articles or interrupting the travel thereof.

A further object is to provide apparatus for transferring containers having an open end to and from supporting pins on a conveyor chain, without damaging the interior or exterior surface of the containers.

A still further object is to provide such an apparatus wherein there is no sliding contact between the containers and the supporting pins while the transfer is being effected.

Numerous other objects and advantages of the invention will be apparent as it is better understood from the following description, which, taken in connection with the accompanying drawings, discloses a preferred embodiment thereof.

FIG. 1 is a front elevational view of an apparatus constructed according to the principles of the instant invention, with parts broken away and with parts in section;

FIG. 2 is an enlarged sectional view taken substantially along line 2—2 in FIG. 1; and FIG. 3 is an enlarged sectional view taken substantially along line 3—3 of FIG. 1.

As a preferred or exemplary embodiment of the instant invention, FIG. 1 illustrates apparatus for handling hollow articles such as extruded aluminum can bodies C which are stacked in an in-feed chute 10. The chute 10 has a curved bottom portion 12 within which is centered an indexing wheel 14 having circumferentially spaced recesses 16 which pick-off the cans C from the bottom of the chute 10 and advance them into the instant transfer mechanism. The indexing wheel 14 is rigidly mounted on a laterally extending shaft 18 which is rotatably mounted in bearing members 20 (see FIGS. 1 and 2) and rotatably driven by any suitable driving means (not shown). The bearing members 20 are bolted or otherwise rigidly attached to a pair of longitudinally extending frame members 22 which are supported on the main frame 23 for the instant apparatus.

As shown in FIG. 2, a gear 24 is rigidly mounted on one end of the indexing wheel shaft 18 and is in engagement with a second gear 26 which is rigidly mounted on a shaft 28 that is in turn rotatably mounted in bearing members 30 supported by the frame members 22. A support member or transfer turret 32 having a hub 33 is keyed to the shaft 28 for rotation therewith and comprises laterally or axially extending, circumferentially spaced, dovetailed runways or tracks 34 in which slide members 36 are slideably mounted, the tracks 34 at one end extending from the hub 33 and at the other end being bolted to a ring 35 which ties them together in a rigid assembly. Each of the slide members 36 is formed with a can receiving pocket 38 which receives a can C from the wheel 14 and with a stop finger 39 disposed at one end thereof for preventing the can C within the pocket 38 from accidentally moving laterally out of the pocket. Each pocket 38 is arcuate in cross section to conform to the configuration of the can C and has its forward side wall extended to form a slightly curved ramp portion 37 to provide a gentle rolling action to a can C as it leaves the pocket 38, as will hereinafter be explained.

The lateral or axial movement of the slide members 36 on the turret 32 is controlled by a stationary cam member 40 having a laterally extending bracket 41 which is bolted or otherwise rigidly attached to the front bearing member 30 which is in turn supported on the front frame member 22. Each of the slide members 36 carries a cam roller 42 which extends through a slot 43 formed in the base of the track 34 and operates in a spiral or helical cam groove 44 in the stationary cam member 40. Rotation of the turret 32, therefore, results in a predetermined lateral movement of the slide members 36 in the turret runways 34, the lateral movement being effected by the movement of the cam rollers 42 in the helical cam groove 44 of the stationary cam member 40.

A sprocket 48 (FIG. 2) is rigidly attached to the turret hub 33 and is engaged by an endless chain conveyor 50 which has a plurality of can supporting pins 52 mounted thereon and laterally extending therefrom. The supporting pins 52 preferably are of a length which is greater than the longitudinal height of the cans C and are equally spaced on the chain 50 a distance which is substantially equal to the circumferential spacing of the centers of the pockets 38 in the slide members 36 on the turret 32. Also, the supporting pins 52 are positioned on the chain 50 so that they are in lateral alignment with the turret pockets 38 when the portion of the chain 50 upon which they are mounted is in engagement with the turret sprocket 48. As shown in FIG. 2, the lateral movement of the slide members 36 on the turret 32, in response to the movement of the cam rollers 42 in the helical cam groove 44, transfers the cans C within the pockets 38 from the turret 32 to a position where they enclose the front ends of the aligned supporting pins 52 after somewhat less than 180 degress of turret rotation. Each pin 52 has an enlarged portion 53 on the free end thereof which engages the interior of a can C on the pin and causes the can C to tilt slightly to insure against accidental removal thereof from the can C after the can C has been fully transferred onto the pin 52. Such transfer is effected when the can C is carried past the end of a curved guide member 51 which is rigidly secured to a bracket 55 mounted on an adjacent stationary portion of the machine. The guide member 51 is normally spaced a slight distance radially outwardly of the can C when the latter is fully seated in the pocket 38. However, as the can C approaches the end of the guide member 51, it rolls a very slight distance along the curved ramp 37 of the pocket 38 and into contact with the guide member 51. Immediately thereafter, when it passes the end of the guide member 51, the can C continues to roll along the pocket ramp 37 and into gentle contact with the enclosed supporting pin 52.

The conveyor chain 50 extends from the turret sprocket 48 to an idler sprocket 54 rigidly attached to a shaft 56 which is rotatably mounted in bearing members 57 supported by the frame members 22. The chain 50 engages around the lower half of the idler sprocket 54 and then extends into a housing 58 or other means for enclosing apparatus for performing a predetermined operation or operations on the cans C, for example, washing, drying or coating of the cans C. The portion of the chain 50 within the housing 58 is supported by a plurality of idler sprockets, e.g., 60, 62, 63 and 64 (FIG. 1) which may be of any size or number and be mutually located in any desired or suitable manner, depending on the type of operation or operations to be performed on the cans C. As the chain 50 leaves the housing 58, it is in engagement with the lower half of an idler sprocket 66 rigidly attached to a shaft 68 that is rotatably mounted in bearing members 69 supported on a second pair of frame members 70.

From the idler sprocket 66 the chain 50 extends onto the upper portion of a sprocket 71 (see FIGS. 1 and 3) which is rigidly attached to the hub 72 of a rotatable turret 73 that is of substantially the same construction as the rotatable turret 32. The turret 73 is rigidly mounted on a shaft 74 that is rotatably driven at the same speed as the turret 32 by any suitable driving means (not shown) and is mounted in bearing members 76 supported by the frame members 70. A plurality of laterally extending, circumferentially spaced, dovetailed runways or tracks 78 are secured to the turret hub 72 and to a tie ring 75, and slide members 80 are slidably disposed in the runways 78 (see FIG. 3). Each of the slide members 80 comprises a can receiving pocket 81 formed with a wall 82 which is arcuate in cross section and has a stop finger 83 to ensure that a can C will remain in the pocket 81.

As shown in FIG. 3, a cam roller 84 is mounted on each slide member 80 and is disposed in a helical cam groove 86 of a stationary cam member 88 which has a bracket 90 that is rigidly attached to the front frame member 70. During rotation of the turret 73, the slide members 80 laterally slide in the dovetailed runways 78 in a predetermined manner that is controlled by the movement of the cam rollers 84 in the cam groove 86.

The circumferential spacing of the centers of the pockets 81 on the turret 73 is substantially equal to the spacing of the supporting pins 52 on the endless chain 50. As shown in FIG. 1, the centers of the pockets 81 are displaced circumferentially slightly behind the supporting pins 52 on the portion of the chain 50 on the turret sprocket 71, so that the cans C, which hang downwardly from the pins 52, will be almost centered with respect to the pockets 81 as the chain 50 leaves the idler sprocket 66.

This circumferental offsetting between the pins 52 and the centers of the pockets 81 is such that the cans C are not fully centered in the pockets 81 when the chain 50 initially contacts the sprocket 71. As a result, the cans C do not fully seat within the pockets 81 immediately, but instead initially contact and ride on the trailing edge of the arcuate pocket wall 82 (see FIG. 1).

However, as the can C and pocket 81 travel upwardly in their circular paths of travel, the pocket 81 gradually moves into position below the can C with the result that the can C drops away from the pin 52 and into fully seated position within the pocket 81, in which position the interior wall of the can C is spaced from the pin 52. Thereafter, as each fully seated can C rotates with its respective pocket 81 on the rotating turret 73, the respective slide member 80 is moved laterally, by the movement of the cam roller 84 in the cam groove 86 of the stationary cam member 88, a sufficient distance to fully remove the can C from its supporting pin 52 on the endless chain 50.

After each can C is removed from its respective supporting pin 52, it is deposited in an exit chute 92 which is supported on a frame 94 rigidly attached to the main frame 23. The conveyor chain 50 and empty supporting pins 52 extend from the turret 72 over a pair of idler sprockets 96 and 98 on the main frame 23 to the turret 32, where the supporting pins 52 again receive cans C thereon.

In the operation of the instant apparatus, the cans C in the in-feed chute 10 are received in the recesses 16 of the indexing wheel 14, which is rotating in a counterclockwise direction as shown in FIG. 1. The indexing recesses 16 are circumferentially spaced a distance which is approximately equal to the circumferential spacing of the pockets 38 in the slide members 36 on the counter-rotating turret 32, and the recesses 16 are positioned so as to be in radial and lateral alignment with the turret pockets 38 when they are adjacent thereto. In this manner, when each can C travels approximately 270 degrees with the indexing wheel 14, it is deposited into the turret pocket 38 of the adjacent slide member 36 which is rotating (in a clockwise direction as seen in FIG. 1) with the turret 32.

The cans C are prevented from leaving the turret pockets 38 by the curved guide member 51 which is rigidly mounted on the bracket 55 secured to the housing 58. As each can C is rotated by the turret 32, its respective slide member 36 is moved laterally (upwardly as shown in FIG. 2) in response to the movement of its cam roller 42 in the cam groove 44 of the stationary cam member 40. Since the conveyor chain 50 is in engagement with the sprocket 48 rigidly attached to the turret 32, it moves with the turret 32, and the supporting pins 52 on the chain 50 remain in lateral alignment with the centers of the turret pockets 38. The supporting pins 52 on the portion of the chain 50 in engagement with the turret sprocket 48 are radially spaced from the bottoms of the turret pockets 38 a distance which is approximately equal to the cross sectional radius of a can C. Thus, after a can C rotates approximately 180° with the turret 32, its respective slide member 36 slides laterally a sufficient distance to move the can C over the adjacent supporting pin 52, as shown in FIG. 2. Since there is no relative sliding movement of the cans C against either the pocket members 36 or the supporting pins 52, the cans C are thus transferred laterally without any damage to the interior or exterior surfaces thereof. Thereafter, as the can C passes the ends of the guide member 51 and is no longer held in the pocket 38 by this guide member, it rolls gently along the pocket ramp 37 and drops gently and without damage onto the pin 52 over which it has been carried by the pocket 38.

Thus, when the chain 50 leaves the turret sprocket 48, the cans C are mounted on the supporting pins 52 and are conveyed by the chain 50 around the idler sprocket 54 and then into the housing 58 wherein the cans C are washed and dried or otherwise treated in a predetermined manner as they pass around the idler sprockets 60 through 64, etc. After the cans C have been thus treated, they are conveyed by the chain 50 around the idler sprocket 66 and then travel upwardly towards the adjacent rotatable turret 73.

As hereinbefore mentioned, the supporting pins 52 on the portion of the chain 50 in engagement with the turret sprocket 71 and the centers of the turret pockets 81 are circumferentially spaced a sufficient distance to align the cans C with each of the turret pockets 81 as the cans C leave the idler sprocket 66. The cans C then enter the pockets 81 in slide members 80 on the turret 73, and the slide members 80 are moved laterally (downwardly as shown in FIG. 3) in response to the movement of the cam rollers 84 in the cam groove 86 of the stationary cam member 88. After approximately 180° of turret rotation, the slide members 80 move laterally a sufficient distance to completely remove each can C from its respective supporting pin 52, as shown in FIG. 3. During this rotation of the cans C with the turret 73, the cans C are prevented from being radially displaced from the pockets 82 by a curved guide member 102 which is rigidly attached to a bracket 103 bolted to the housing 58.

After the cans C have been removed from the supporting pins 52 on the chain 50, they are deposited in the exit chute 92 from which the cans C may be transferred to another conveying means (not shown) for additional treatment, storage or any other desired operation. The chain 50 continues to travel with the empty supporting pins 52 from the turret sprocket 71 to the idler sprockets 96 and 98 and then onto the turret sprocket 48 to repeat the cycle of operation whereby cans C are again received on the supporting pins 52.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. Apparatus for handling hollow articles having an open end, comprising a plurality of sprockets, a conveyor mounted on said sprockets and having laterally extending supporting pins mounted thereon, a first rotatable turret connected to one of said sprockets, means for rotating said first turret and said one sprocket to advance sand conveyor thereon, said first turret having first article carrying means which are laterally slidable thereon and in lateral and circumferential alignment with the pins on the portion of said conveyor on said one sprocket, said first article carrying means comprising a plurality of slide members laterally slidably mounted in circumferentially spaced relation on the periphery of said first turret, each of said slide members having a laterally extending article-receiving pocket and being independently slidable on said turret, means for feeding articles to said slide member pockets with the open article ends facing said conveyor pins, and means for independently controlling the lateral movement of each slide member toward said conveyor so that the article thereon is transferred onto the adjacent conveyor pin after a predetermined rotation of said turret.

2. The apparatus of claim 1 wherein means are provided for treating said articles in a predetermined manner after they are transferred onto said conveyor pins, and wherein means are provided for removing said articles from said pins after they have been so treated.

3. The apparatus of claim 2 wherein said removing means comprises a second rotatable turret connected to a second of said sprockets, means for rotating said second turret and said second sprocket to advance said conveyor thereon, said second turret having second article carrying means which are laterally slidable thereon and laterally and circumferentially positioned with respect to said pins to receive the treated articles thereon as said pins approach said second sprocket, and means for controlling the lateral movement of said second carrying means so that the articles are laterally removed from said pins after a predetermined rotation of said second turret.

4. Apparatus for transferring hollow articles having open ends to or from supporting pins mounted in spaced relation on and extending laterally from a moving conveyor, comprising a support member disposed adjacent said conveyor and being movable in the same direction and at the same speed as the adjacent portion of said conveyor, a plurality of slide members laterally slidably mounted in spaced relation on said support member and disposed in substantial lateral alignment with the pins on said adjacent conveyor portion, each of said slide members having a laterally extending pocket which is adapted to receive a hollow article with the open end thereof facing said conveyor portion and being independently slidable on said support member to a position wherein said pocket is disposed subjacent a pin on said conveyor portion, and means for independently laterally moving said slide members on said support member in response to movement of the latter.

5. The apparatus of claim 4 wherein said support member comprises a rotatable turret having means operatively associated therewith on which said adjacent portion of the conveyor is mounted for rotation with said turret.

6. The apparatus of claim 5 wherein said slide member moving means comprises a stationary cam member having a cam groove therein, and a cam roller mounted on each of said slide members and disposed in said cam groove.

7. The apparatus of claim 6 wherein a curved guide member surrounds and is concentric with the upper portion of said rotatable turret to prevent accidental radial displacement of articles within the pockets of said slide members, and wherein means are provided on said slide members to prevent accidental lateral removal of said articles from said pockets during movement of said slide members.

8. The apparatus of claim 6 wherein each slide member has a ramp portion adjacent the leading edge thereof to allow an article in the pocket thereof to gently roll out of said pocket when the leading end of said slide member is inclined downwardly to a predetermined extent.

References Cited by the Examiner

UNITED STATES PATENTS 2,950,805   11/1954   Heimlicher _____ 198—25

SAMUEL F. COLEMAN, *Primary Examiner.*

RICHARD E. AEGERTER, *Examiner.*